(No Model.) 2 Sheets—Sheet 1.
H. M. FREELAND.
UMBRELLA SUPPORTER.
No. 592,050. Patented Oct. 19, 1897.
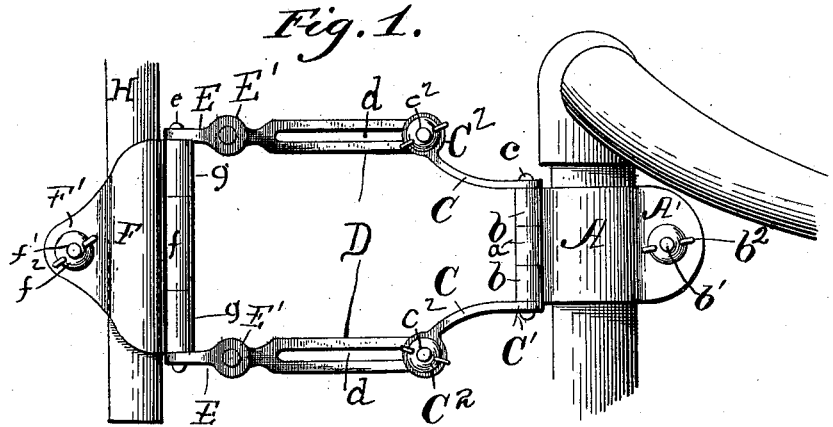
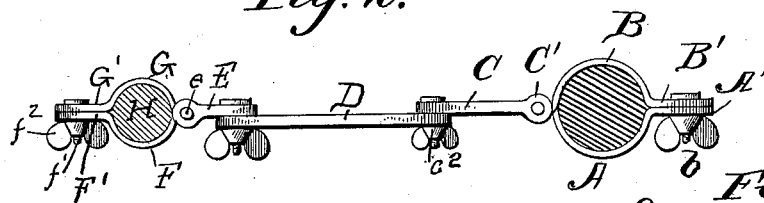
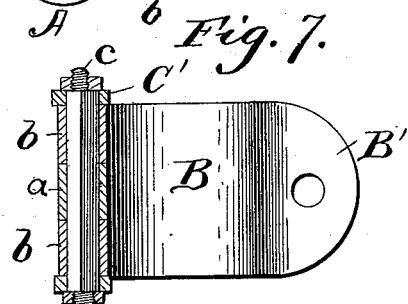
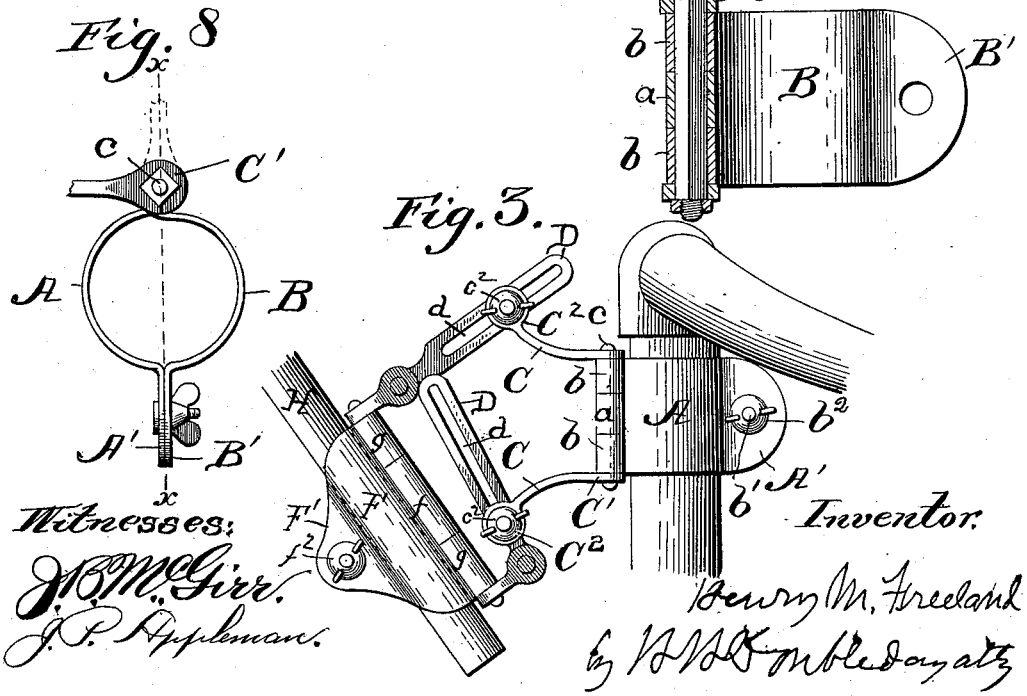
Witnesses:
J. C. McGirr.
J. P. Appleman.
Inventor:
Henry M. Freeland
by H. H. Doubleday atty (No Model.) 2 Sheets—Sheet 2.

H. M. FREELAND.
UMBRELLA SUPPORTER.

No. 592,050. Patented Oct. 19, 1897.

Witnesses:
J. B. McGirr.
J. P. Appleman.

Inventor:
Henry M. Freeland

ABOUT THIS DOCUMENT

UNITED STATES PATENT OFFICE.

HENRY M. FREELAND, OF RUTHERFORD, NEW JERSEY.

UMBRELLA-SUPPORTER.

SPECIFICATION forming part of Letters Patent No. 592,050, dated October 19, 1897.

Application filed May 26, 1896. Serial No. 593,144. (No model.)

*To all whom it may concern:*

Be it known that I, HENRY M. FREELAND, a citizen of the United States, residing at Rutherford, in the county of Bergen and State of New Jersey, have invented certain new and useful Improvements in Umbrella-Supporters, of which the following is a specification, reference being had therein to the accompanying drawings.

Figure 4:
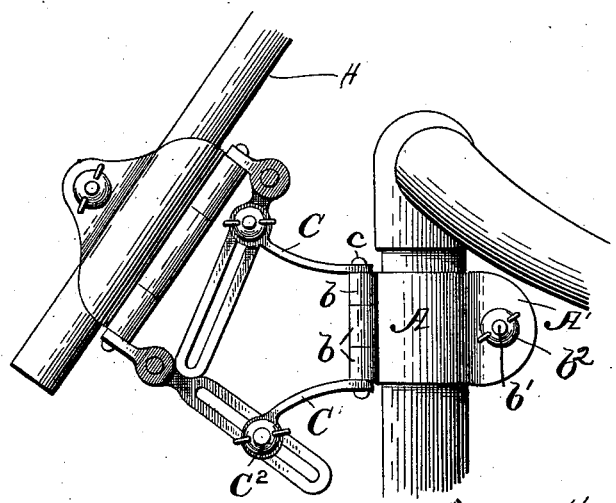
Figure 5:
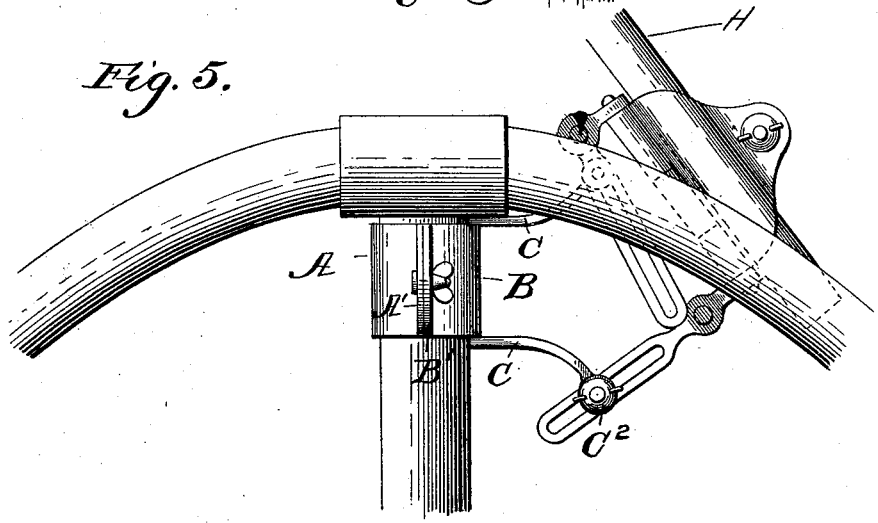
Figure 6:
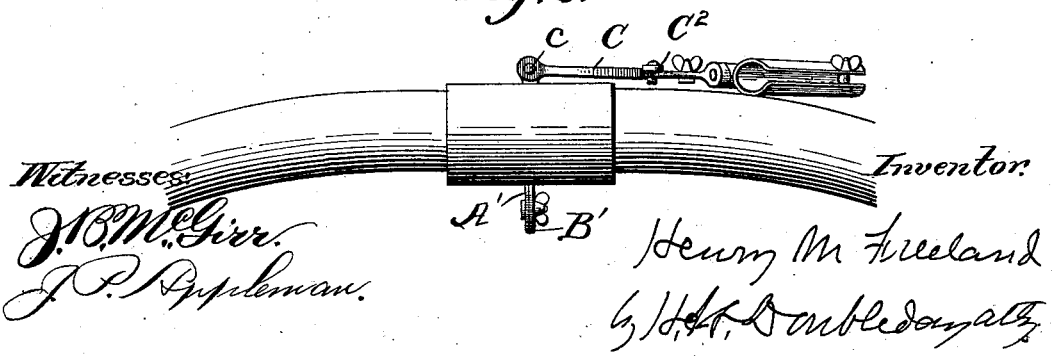

Figure 1 is a side elevation of part of the steering-post of a bicycle having my invention applied thereto. Fig. 2 is a top or plan view of Fig. 1. Fig. 3 is a side elevation showing the umbrella-handle inclined forward. Fig. 4 is a side elevation showing the umbrella-handle inclined rearward. Fig. 5 is a rear elevation showing the umbrella-handle inclined sidewise. Fig. 6 is a top or plan view of Fig. 5. Figs. 7 and 8 are details enlarged.

Like reference-letters refer to similar parts wherever applied.

A A′ B B′ indicate generally a tubular clamp adapted to be attached firmly to the steering-post or other suitable part of a bicycle or other vehicle. Of this clamp the parts A′ B′ constitute flat ear-like plates or flanges which project from the semitubular sections A B, there being lips $a$ $b$ $b$, which project from the opposite sides of the parts A B, and are tubular in cross-section to be mounted upon a pintle-like part $c$, which will be hereinafter fully explained.

$b'$ is a binding-screw, and $b^2$ a thumb-nut, for binding or gripping the clamp to the steering-post.

C C are branching bracket-arms, each expanded laterally at its inner end into a plate or ear C′, with a perforation to receive one end of the part $c$, which, when the parts are in proper working relation, becomes a post or upright bar of the bracket.

I prefer to so construct the device that the bracket-post shall be practically rigid with the member B B′ of the clamp and this end may be attained by making said post angular in cross-section with the tubular ears $b$ $b$, fitting closely thereto; or, under some circumstances, the bracket-post may be round in cross-section and the ears or lips $b$ $b$ gripped thereon firmly in the process of manufacture, or said ears may be brazed or sweated to the bracket-post. The lip or ear $a$ is hinged to the central portion of the bracket-post, which should be round in cross-section at that point at any rate, so that the section A A′ can be opened to facilitate applying the clamp to the steering-post, or removing it therefrom, horizontally opening the movable member, and when it is desired that the bracket-arms shall maintain a practically-uniform relation to the part B B′ and the bracket-posts these parts may be firmly secured to each other by riveting down the ends of the post tightly upon the ears C′ C′. Each bracket-arm is, at its outer end, expanded vertically into a plate or disk-like part $C^2$, which has a central aperture to receive a binding-screw $c'$ and thumb-nut $c^2$ for clamping one of the normally horizontal bars D, which is pivoted upon said screw, both bars being slotted as at $d$; or they may be provided with a series of holes to receive the screws. Each bar D is expanded vertically at its outer end, where it is pivoted to a bracket-arm E E′, the opposite end of which is attached to a bracket-post $e$, the central portion of which serves as a pintle for the swinging section F F′ of a tubular clamp adapted to carry the handle of an umbrella.

A convenient form of umbrella-carrier is substantially like that of the clamp which takes hold of the steering-post—that is to say, it may have a swinging member and a rigid member G G′, provided with lips $g$ $g$, fixedly connected to the bracket-post $e$, the member F F′ having a lip or eye $f$ hinged upon the central portion of the post.

$f'$ $f^2$ are respectively a binding-screw and thumb-nut, by which the clamp can be gripped to the umbrella-handle, (indicated at H.)

In the position of parts indicated in Fig. 1 the handle or staff of the umbrella will be supported in a vertical position directly in front of the rider.

In Fig. 3 the staff is inclined forward to about the limit of its throw in that direction; while in Fig. 4 the staff is inclined backward about as far as is possible, it being evident that the slots $d$ $d$ permit a great range of adjustments between these extremes.

There is one feature of construction which contributes effectively to the support of the umbrella-handle in all the above-indicated positions—that is to say, one of the pivots $d'$ $d'$ serves as a fulcrum, while the other one serves as a resistance; and this whether the handle be considered as a lever of the first order, or as a lever of the second order; and with both the fulcrum and the resistance there is combined means for supporting them separately in the various positions to which they may be adjusted both vertically and horizontally as contradistinguished from those prior umbrella-supports in which the handle-clamp is mounted to swing about a single pivot for each adjustment; the parts at the pivotal points being held against rotation about each pivot, respectively, by a gripping thumb-screw. In my invention the pivoted parts constituting the fulcrum and resistance are not clamped together, but are held in working relation to each other by means of the two horizontal pivoted and independently-endwise and angularly-adjustable bars, which are themselves supported upon and vibrate about bracket-arms in opposite angular directions forward from a clamp mounted on the steering-post, whereby certain advantages are secured, as will be more fully explained.

It is frequently found desirable to incline the umbrella-handle sidewise while keeping it practically in line with the upper end of the steering-post; and it will be seen by an examination of the drawings that that cannot be done by turning the tubular clamp around on the post, because such movement would bring the ends C' of the bracket-arms directly under that part of the handle-bar which lies next to the post, so that it would be impossible to retain the handle in its clamp; but by connecting the branching bracket-arms to the clamp at a point a short distance in front of the post it becomes practicable to move the said arms around horizontally to a position at right angles to that shown in Fig. 2, and into the position shown in Fig. 6, without interfering in the least with the handle, or with adjusting its inclination to either extreme of its capability.

In order to permit the horizontal adjustment of the bracket-arms to either of the above-indicated positions, and at the same time lock them firmly in either of those positions, I propose to make the upper end, or both ends, of the bracket-post square or otherwise angular in cross-section, with correspondingly-shaped holes in the inner ends of the arms, and apply nuts to the ends of the said post, as is shown in Figs. 7 and 8, which are somewhat enlarged to more plainly illustrate such construction. The flexibility insured by the pivoting of the ends of the parallel bars provides for readily taking the bracket-arms off from the ends of the bracket-post and replacing them as may be found desirable in making the adjustments.

Another advantage possessed by my invention is the capability of placing the parts in such position that one of the bars D can be disposed alongside of one of the bracket-arms, and be made to serve as a brace to support the umbrella against the wind when it is blowing in a direction transverse to the line of travel of the bicycle; and the employment of thumb-nuts facilitates shifting the arms to whichever side of the bracket-arms will give the best support to the umbrella; but I do not wish to be limited to these details of construction, because many of the advantages of my invention can be made use of without any flexibility between the bracket and the tubular clamp except the movement of the hinged part A A', when the device as a whole is being applied to or removed from the post or adjusted thereon. It is very desirable, in order to secure sufficient support for the umbrella, that its clamp should be of considerable length, and that the parallel bars should be attached to the clamp at its ends; and that in order to provide for a satisfactory range of adjustment of inclination the bars should be of about the relative length shown, with their slotted ends about as far apart as are their forward ends. These conditions or requirements are provided for in part by the employment of the branching arms C C, while at the same time I am enabled to use a short tubular clamp on the steering-post, at which point I would not, under many circumstances, be able to mount one of the length of that which holds the umbrella.

One advantage which is incident to pivoting the bars to the arms C C, at some distance from the tubular clamp A A' B B', is this: With such disposition of parts I can turn the said clamp around on the post far enough to get quite a sidewise inclination of the umbrella-handle even with the arms rigidly connected to the bracket-post and the post rigidly connected to the member B B' of the clamp, as will be readily understood without further explanation.

Having now described the best mode known to me for carrying my invention into practice, I wish to say that I do not desire to be limited to the exact details of construction shown, because many modifications thereof will suggest themselves to a person skilled in the art without going outside of the spirit of my improvement.

What I claim is—

1. In an umbrella-support, the combination of a clamp adapted to be mounted on a steering-post, bracket-arms projecting in opposite angular directions up and down from said clamp, a clamp adapted to carry an umbrella two horizontal bars each pivoted at one end to one end of the umbrella-clamp, and means for adjustably connecting the said bars to the bracket-arms, substantially as set forth.

2. In an umbrella-support, the combination of a clamp adapted to be mounted on a steering-post and having two members which are united by a vertical pivot, two bracket-arms mounted on said vertical pivot and projecting forward therefrom, a clamp adapted to carry an umbrella and having two members which are united by a vertical pivot, two bars disposed one above the other and each pivotally connected at one end to the vertical pivot of the umbrella-clamp and at its opposite end to one of the bracket-arms, substantially as set forth.

3. In an umbrella-support, the combination of a clamp adapted to be mounted on the steering-post, a clamp adapted to carry an umbrella, bars pivoted to the umbrella-clamp and supporting respectively a fulcrum and a resistance, the two members of the steering-post clamp, and the bracket-arms and bracket-post connecting the bars with the two members of the steering-post clamp, substantially as set forth.

4. The combination with the steering-post and handle-bar of a bicycle, of the clamp having two members united by a vertical pivot, for supporting an umbrella, the clamp having two members united by a vertical pivot, and adapted to be mounted on the said steering-post with its pivot in front of the post the horizontally-adjustable branching bracket-arms mounted on said pivot in front of the steering-post, and means for supporting the umbrella-clamp from the branching bracket-arms, substantially as set forth.

In testimony whereof I affix my signature in presence of two witnesses.

HENRY M. FREELAND.

Witnesses:
 JAMES W. MILLER,
 COOK CONKLING.